(12) United States Patent
Huschenhoefer et al.

(10) Patent No.: US 11,788,592 B2
(45) Date of Patent: Oct. 17, 2023

(54) BRAKE DRUM FOR A VEHICLE DRUM BRAKE

(71) Applicant: Robert Bosch GmbH, Stuttgart (DE)

(72) Inventors: Wolfgang Huschenhoefer, Asslar (DE); Karim Bahroun, Grossbettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 232 days.

(21) Appl. No.: 16/761,787

(22) PCT Filed: Nov. 8, 2018

(86) PCT No.: PCT/EP2018/080555
§ 371 (c)(1),
(2) Date: Feb. 8, 2021

(87) PCT Pub. No.: WO2019/092071
PCT Pub. Date: May 16, 2019

(65) Prior Publication Data
US 2021/0156439 A1    May 27, 2021

(30) Foreign Application Priority Data
Nov. 9, 2017  (DE) .................... 10 2017 219 924.5

(51) Int. Cl.
*F16D 65/10* (2006.01)
*F16D 51/00* (2006.01)
(Continued)

(52) U.S. Cl.
CPC ............ *F16D 65/10* (2013.01); *F16D 51/00* (2013.01); *F16D 69/027* (2013.01);
(Continued)

(58) Field of Classification Search
CPC ............. F16D 65/10; F16D 2065/1324; F16D 69/0416
See application file for complete search history.

(56) References Cited

U.S. PATENT DOCUMENTS 2,011,772 A * 8/1935 Mulhern ................ B22D 19/00
164/111
3,092,214 A * 6/1963 Batchelor ............... F16D 65/10
188/218 R
(Continued)

FOREIGN PATENT DOCUMENTS

CN 103080592 A 5/2013
CN 106122323 A 11/2016
(Continued)

OTHER PUBLICATIONS

English human translation of DE-102009017 A1 Nov. 2009 (Year: 2009).*
(Continued)

*Primary Examiner* — Melody M Burch
(74) *Attorney, Agent, or Firm* — Maginot, Moore & Beck LLP

(57) ABSTRACT

A brake drum for a drum brake, in particular of a motor vehicle, includes a cylindrical jacket and a support pot which axially adjoins the jacket and which has a hub ring portion to be secured to a wheel hub. The monolithic brake drum is formed at least in part of a fiber-reinforced plastic.

15 Claims, 2 Drawing Sheets

(51) Int. Cl.
*F16D 69/02* (2006.01)
*F16D 69/04* (2006.01)
*F16D 65/02* (2006.01)

(52) U.S. Cl.
CPC .. *F16D 69/0416* (2013.01); *F16D 2065/1324* (2013.01); *F16D 2065/1344* (2013.01); *F16D 2069/045* (2013.01); *F16D 2200/0004* (2013.01); *F16D 2200/006* (2013.01); *F16D 2200/0039* (2013.01)

(56) References Cited

U.S. PATENT DOCUMENTS

| | | | | |
|---|---|---|---|---|
| 3,373,484 | A | * | 3/1968 | Larson .................. F16D 65/10 188/73.1 |
| 4,266,634 | A | * | 5/1981 | Hishida .................. F16D 49/16 188/80 |
| 2003/0155193 | A1 | | 8/2003 | Hays, Jr. et al. |
| 2006/0278484 | A1 | * | 12/2006 | Antolovic ............... F16D 65/09 188/323 |

FOREIGN PATENT DOCUMENTS

| | | | |
|---|---|---|---|
| CN | 205908672 A | 1/2017 | |
| DE | 26 11 078 A1 | 9/1977 | |
| DE | 19858317 A1 * | 6/2000 | ............. F16D 65/10 |
| DE | 10 2009 017 295 A1 | 11/2009 | |
| DE | 20 2011 100 166 U1 | 11/2012 | |
| DE | 10 2011 089 918 A1 | 6/2013 | |
| DE | 10 2013 201 911 A1 | 8/2014 | |
| DE | 202016103195 U1 * | 8/2016 | ............... B60G 7/02 |
| DE | 10 2015 212 017 A1 | 12/2016 | |
| EP | 0 490 021 A1 | 6/1992 | |
| EP | 0781935 A2 * | 7/1997 | |
| FR | 2734195 A1 * | 11/1996 | ........... B23K 9/0026 |
| GB | 1338927 A | 11/1973 | |
| JP | 624944 U * | 3/1987 | |
| KR | 10-2008-0036385 A | 4/2008 | |

OTHER PUBLICATIONS

International Search Report corresponding to PCT Application No. PCT/EP2018/080555, dated Jan. 29, 2019 (German and English language document) (7 pages).

* cited by examiner

BRAKE DRUM FOR A VEHICLE DRUM BRAKE

This application is a 35 U.S.C. § 371 National Stage Application of PCT/EP2018/080555, filed on Nov. 8, 2018, which claims the benefit of priority to Serial No. DE 10 2017 219 924.5, filed on Nov. 9, 2017 in Germany, the disclosures of which are incorporated herein by reference in their entirety.

BACKGROUND

The disclosure relates to a brake drum for a drum brake, in particular of a motor vehicle, comprising a cylindrical casing and an axially adjoining carrier pot, the carrier pot comprising a hub ring portion for fixing to a wheel hub.

The disclosure further relates to a drum brake apparatus for a vehicle wheel brake, in particular of a motor vehicle.

PRIOR ART

Brake drums are already disclosed by the prior art. Drum brakes are friction brakes in which brake linings act on a cylindrical surface, that is to say the brake drum. The brake drum is a cup-shaped metal body, which can be or is be fixedly attached to the wheel hub of vehicles, in particular motor vehicles. Operating the brake causes a brake lining to be pressed basically radially from inside towards the brake drum rotating with the wheel, thus reducing the kinetic energy and converting it into heat. The resulting heat is absorbed by the brake drum and given off to the surrounding air. In view of the increasing requirements with regard to fuel consumption and load-bearing capacity, efforts are being made to make weight-savings also on the brakes of vehicles, in particular motor vehicles. Accordingly, there is a desire to use light-weight materials, wherever possible

SUMMARY

The brake drum according to the disclosure has the advantage that the brake drum, for a low weight, affords a sufficiently high load-bearing capacity for applications also in passenger vehicles. This weight reduction achieved by the brake drum according to the disclosure has a direct effect on the unsprung mass, since the brake drum is one of the unsprung masses of a vehicle and therefore improves the driving performance of the vehicle, and in particular increases the safety. The brake drum according to the disclosure is a simple and cost-efficient way of achieving a low weight. For this purpose, the brake drum, formed in one piece, is formed at least in part from a fiber reinforced plastic (FRP). Forming the brake drum from fiber reinforced plastic with the resulting reduction in weight achieves not only an improvement in the running characteristics but also a reduction in the fuel consumption. For the fiber reinforced plastic, the brake drum is preferably produced from a fiber reinforced, in particular a high temperature-resistant plastic which comprises a multiple fiber layers each composed of a plurality of fibers, the fibers of at least two adjacent layers being oriented in different directions to one another. The differently oriented fiber layers give the brake drum a high mechanical load-bearing capacity for a low weight. The choice of a high temperature-resistant plastic ensures the dimensional stability of the brake drum and therefore the optimum introduction of force into the fibers even at temperatures in excess of 150° C. In addition, the manufacture of fiber reinforced plastic has become less expensive in recent years, so that the advantageous shaping of the brake drum does not incur significant cost disadvantages.

In a preferred embodiment the brake drum is formed entirely from a fiber reinforced plastic. This has the advantage of increasing the weight reduction effect still further with a further accompanying reduction in fuel consumption. Furthermore, the additional weight reduction affords a further improvement in the performance of the vehicle. Moreover, producing the brake drum from a single material facilitates the production process, in turn saving costs.

In a further preferred embodiment, the brake drum comprises one or more supporting fibers extending in conformity with the load path. This embodiment has the advantage that the brake drum is capable of withstanding higher load stresses. In particular, the supporting fibers extending in conformity with the load path ensure that the brake drum is supported or reinforced at the critical points. It is particularly advantageous if the supporting fibers are provided in the brake drum in such a way that at least in the main they are subjected only to tensile stresses. Through especially advantageous exploitation of the high stability of the supporting fibers in relation to tensile stresses, it is possible to achieve a particularly high stability of the brake drum for a particularly low weight. In the context of the present disclosure, the expression "supporting fiber extending in conformity with the load path" is taken to mean a supporting fiber which in its longitudinal extent is oriented and in particular infolded along a load path in the fiber reinforced plastic, the load paths in a brake drum being determined, for example, through tests and/or a simulation of the brake drum under load, in particular through a braking operation.

In a development of the disclosure a cylindrical friction ring is arranged on an inside of the casing. The additional arrangement of a friction ring in the brake drum carries the advantage that, irrespective of the brake drum material and the associated advantage of the low weight, it is possible to select a material optimally suited to the braking action of the friction ring.

In a further embodiment of the disclosure the friction ring comprises metallic and/or ceramic components. This has the advantage that the metallic and/or ceramic components in the friction ring serve to increase the mechanical stability. Furthermore, the ceramic components additionally have the advantage that they reliably achieve the necessary braking effect even at high operating temperatures.

In a preferred embodiment of the disclosure the brake drum comprises at least one radially inner and at least one radially outer area of the carrier pot, the radially inner area being arranged axially offset in relation to the radially outer area, and the carrier pot comprising a transition between the radially inner area and the radially outer area, and the transition having a curvature. This has the advantage that due to the curvature of the transition between axially offset areas the fibers in the fiber reinforced plastic are not buckled or deformed in such a way that they might break.

In a further embodiment of the disclosure the curvature has a radius which is at least equal to or greater than, in particular twice the minimum bending radius of the brake drum or the material of the brake drum and/or of the fibers, or more. This embodiment has the advantage that the curvature serves to prevent such bending, as a result of which the fibers and the brake drum itself may break. The minimum angle is preferably dependent on the fibers used for the fiber reinforced plastic, and the person skilled in the art is capable of inferring the information on this, in particular the bending radius, from the specifications/data sheets of the fibers.

In a development of the disclosure a transition, in particular a casing transition, from the cylindrical casing into the axially adjoining carrier pot comprises a curvature, the curvature in particular having a radius which is at least equal to or greater than, in particular twice the minimum bending radius of the brake drum or the material of the brake drum and/or of the fibers, or more. Among other things this has the advantage that, at the point of the transition from the carrier pot into the cylindrical casing critical for the transmission of forces, a curvature is provided such that no fibers in the fiber reinforced plastic present in the area of the transition can be bent in such a way that they break. It can thereby be ensured, at a crucial point for the functioning of the brake drum, that the stability and the forces can be transmitted through the transition by means of the fibers contained.

In a further embodiment of the disclosure the friction ring is at least partially enclosed, in particular encased by the material of the brake drum in order to embed it in the brake drum. This has the advantage that encasing or enclosing the friction ring with the brake drum material affords a materially bonded union and moreover keeps the overall height to a minimum.

In a further embodiment of the disclosure the friction ring is attached to the brake drum by a fiber tie, the fiber tie connecting the friction ring on the one hand and the brake drum on the other. This embodiment is a particularly advantageous way of ensuring that the forces which are transmitted from the brake shoes to the friction ring during braking can be transmitted to the brake drum by a fiber tie that is preferably at least in the main subjected only to tensile stresses, thereby affording an especially high degree of stability and strength for a particularly low weight.

In a further embodiment of the disclosure the friction ring is attached to the fiber-reinforced plastic by one or more retaining fibers. Furthermore, the one or more retaining fibers preferably extend in conformity with the load path. In the context of the present disclosure the expression "retaining fiber extending in conformity with the load path" is taken to mean a retaining fiber which in its longitudinal extent is oriented and in particular infolded along a load path in the fiber reinforced plastic, the load paths in a brake drum being determined, for example, through tests and/or a simulation of the brake drum under load, in particular through a braking operation. This has the advantage in particular that the friction ring is directly attached to the fiber reinforced plastic by the specially provided retaining fibers. This affords a direct transmission of preferably tensile forces and therefore achieves a particularly high brake drum stability.

In a further embodiment of the disclosure the friction ring comprises cooling fins which extend radially outwards. In a further embodiment the friction ring comprises cooling fins which extend radially outwards, the cooling fins extending radially outwards through openings in the brake drum. These embodiments have the advantage that the heat generated in the braking operation can be conducted outwards in a particularly advantageous manner, that is to say dissipated outside the brake drum.

The disclosure further relates to a drum brake apparatus for a wheel brake of a vehicle, in particular a motor vehicle, having at least one brake drum and at least one brake shoe displaceably arranged in or on the brake drum, in which at least the one brake shoe can be pressed against the casing of the brake drum in order to perform a braking operation, characterized by the formation of the brake drum. This affords the advantages already described.

Further advantages and preferred features and combinations of features emerge, in particular, from the description above and from the claims.

BRIEF DESCRIPTION OF THE DRAWINGS

The disclosure will be explained in more detail below with reference to several figures, of which

DETAILED DESCRIPTION

Figure 1:
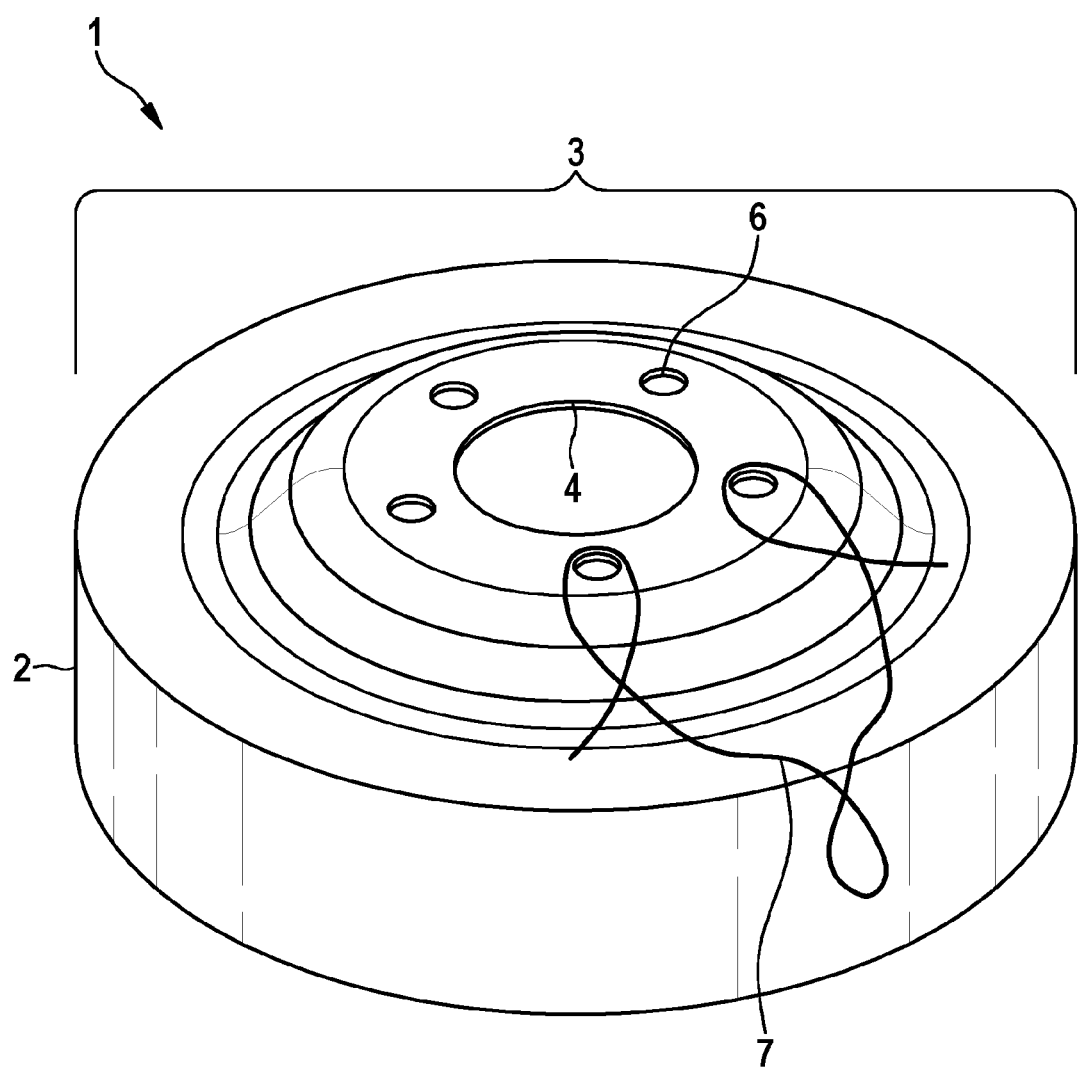
FIG. 1 shows an advantageous brake drum.

FIG. 1 shows an advantageous brake drum 1. The brake drum 1 comprises a cylindrical casing 2 and an axially adjoining carrier pot 3. The brake drum 1 and in particular the cylindrical casing 2 and the adjoining carrier pot 3 are formed in one piece, at least in part from a fiber reinforced plastic. The advantage of this is that the brake drum 1 can be made significantly lighter in weight than a steel brake drum, the fiber reinforced plastic successfully achieving this for the same strength and stability. Radially inside, the carrier pot comprises a hub ring on the portion for fixing to a wheel hub 5 (not shown in FIG. 1), openings 6 being provided for fixing to the wheel hub 5. FIG. 1 further shows a supporting fiber 7, which extends in conformity with the load path. The supporting fiber extending in conformity with the load path in particular ensures that the forces occurring in the cylindrical casing 2 during a braking operation can be transmitted to the carrier pot 3 and in particular the openings 6.

Figure 2:
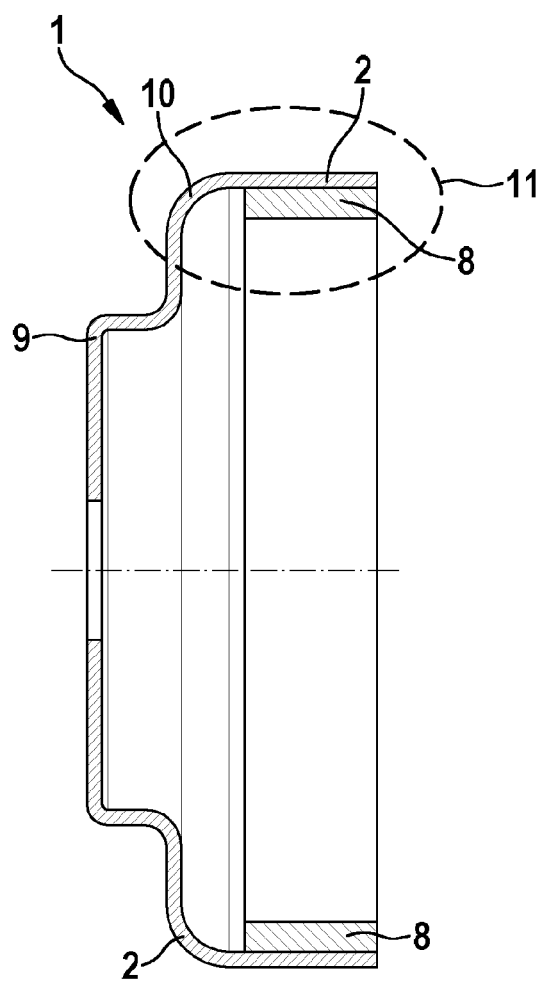
FIG. 2 shows the advantageous brake drum in FIG. 1 in cross section.

FIG. 2 shows the advantageous brake drum 1 in FIG. 1 in cross section, in which a cylindrical friction ring 8 is shown situated inside the cylindrical casing 2. FIG. 2 further shows that the carrier pot 3 comprises a curved transition 9 between a radially inner area and a radially outer area, the radially inner area and the radially outer area being axially offset. The curved shape of the transition 9 has the advantage that fibers present in the fiber reinforced plastic cannot break due to excessive bending.

FIG. 2 further shows a curved transition 10, in particular a curved casing transition, between the cylindrical casing and the axially adjoining carrier pot 3. Here too, the curved transition has the advantage that at a point where particularly high forces occur in the braking operation the fibers present in the fiber reinforced plastic are not bent by the curvature in such a way that they might break and be no longer capable of performing their function of additional reinforcement.

Figure 3:
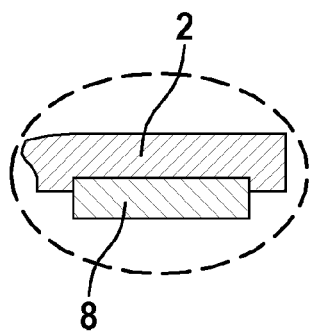
FIG. 3 shows a friction ring which is embedded in the brake drum.
Figure 4:
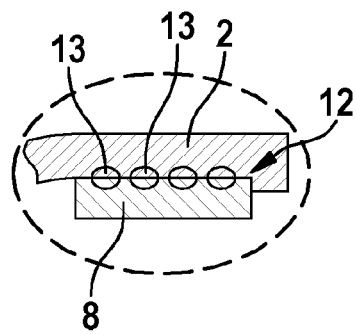
FIG. 4 shows a friction ring which is connected to the brake drum by a fiber tie.
Figure 5:
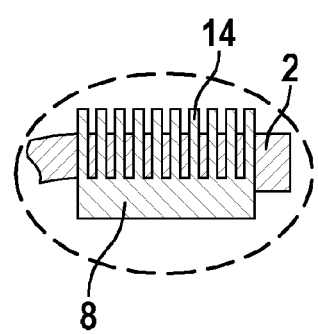
FIG. 5 shows a friction ring which comprises cooling fins extending radially outwards.

The detail 11 furthermore identifies an area which in the following FIGS. 3 to 5 shows further details for the application of the friction ring 8 to the brake drum 1.

FIG. 3 shows the detail 11 in FIG. 2 according to a further exemplary embodiment, in which the friction ring 8 is encased in the material of the brake drum 2. This affords the advantage that a solid, in particular materially bonded union is produced between the brake drum 2 and the friction ring 8.

FIG. 4 likewise shows the detail 11 in FIG. 2 according to a further exemplary embodiment, in which the friction ring 8 on the fiber reinforced plastic is attached to the brake drum 2 by means of a fiber tie 12, and retaining fibers 13 are additionally introduced for attachment to the fiber reinforced plastic. This has the advantage that due to the fiber tie 12 and the additional retaining fibers 13 a particularly stable union can be achieved between the brake drum 1, in particular the cylindrical casing 2, so that the forces introduced into the friction ring 8 during a braking operation can be optimally transmitted to the brake drum 2 and thereby to the wheel hub 5 (not shown in FIG. 4 here).

FIG. 5 likewise shows the detail 11 in FIG. 2 according to a further exemplary embodiment, in which the friction ring 8 comprises cooling fins 14 extending outwards. This has the advantage in particular that the heat generated on the friction ring 8 during the braking operation can be optimally conducted outwards to the surrounding air via the cooling fins 14.

The invention claimed is:

1. A brake drum arrangement for a drum brake, comprising:
   a brake drum comprising:
      a cylindrical casing; and
      a carrier pot that axially adjoins the cylindrical casing, the carrier pot including a hub ring portion configured to fix to a wheel hub,
      wherein the brake drum, which is formed in one piece, is formed at least in part from a fiber reinforced plastic; and
   a cylindrical friction ring arranged on an inside of the cylindrical casing, the friction ring comprising metallic or ceramic components,
   wherein the friction ring is attached to the brake drum by a fiber tie, and wherein the fiber tie is connected to the friction ring and to the brake drum so as to connect the friction ring to the brake drum.

2. The brake drum arrangement as claimed in claim 1, wherein the brake drum is formed entirely from the fiber reinforced plastic.

3. The brake drum arrangement as claimed in claim 1, wherein the brake drum comprises one or more supporting fibers extending in conformity with a load path.

4. The brake drum arrangement as claimed in claim 1, wherein:
   the brake drum comprises at least one radially inner area of the carrier pot and at least one radially outer area of the carrier pot,
   the radially inner area is arranged axially offset in relation to the radially outer area, and
   the carrier pot comprises a transition between the radially inner area and the radially outer area, and the transition comprises a curvature.

5. The brake drum arrangement as claimed in claim 4, wherein the curvature has a radius of at least 2 mm.

6. The brake drum arrangement as claimed in claim 5, wherein the curvature has a radius of at least 6 mm.

7. The brake drum arrangement as claimed in claim 1, wherein a transition from the cylindrical casing into the carrier pot comprises a curvature, and wherein the curvature has a radius of at least 2 mm.

8. The brake drum arrangement as claimed in claim 7, wherein the transition is a casing transition, and wherein the curvature has a radius of at least 6 mm.

9. The brake drum arrangement as claimed in claim 1, wherein the friction ring is at least partially enclosed by the material of the brake drum such that the friction ring is partially embedded in the material of the brake drum.

10. The brake drum arrangement as claimed in claim 9, wherein the friction ring is encased by the material of the brake drum in order to embed the friction ring in the brake drum.

11. A drum brake apparatus for a wheel brake of a vehicle, comprising:
   the brake drum arrangement as claimed in claim 1; and
   at least one brake shoe displaceably arranged in or on the brake drum, the at least one brake shoe configured to be pressed against the brake drum in order to perform a braking operation.

12. The drum brake apparatus as claimed in claim 11, wherein the vehicle is configured as a motor vehicle.

13. The brake drum arrangement as claimed in claim 1, wherein the drum brake is a drum brake of a motor vehicle.

14. The brake drum arrangement as claimed in claim 1, wherein a curved transition is formed between the cylindrical casing and the carrier pot, and at least one supporting fiber extends through the curved transition from the cylindrical casing to the carrier pot.

15. A brake drum arrangement for a drum brake, comprising:
   a brake drum comprising:
      a cylindrical casing; and
      a carrier pot that axially adjoins the cylindrical casing, the carrier pot including a hub ring portion configured to fix to a wheel hub,
      wherein the brake drum, which is formed in one piece, is formed at least in part from a fiber reinforced plastic; and
   a cylindrical friction ring arranged on an inside of the cylindrical casing, the friction ring comprising metallic or ceramic components,
   wherein the friction ring is at least partially enclosed by the material of the brake drum such that the friction ring is partially embedded in the material of the brake drum, and
   wherein the friction ring is attached to the fiber reinforced plastic by one or more retaining fibers.

* * * * *